No. 671,953. Patented Apr. 16, 1901.
W. H. DILLON.
POTATO CUTTER AND PLANTER.
(Application filed Aug. 15, 1900.)
(No Model.)
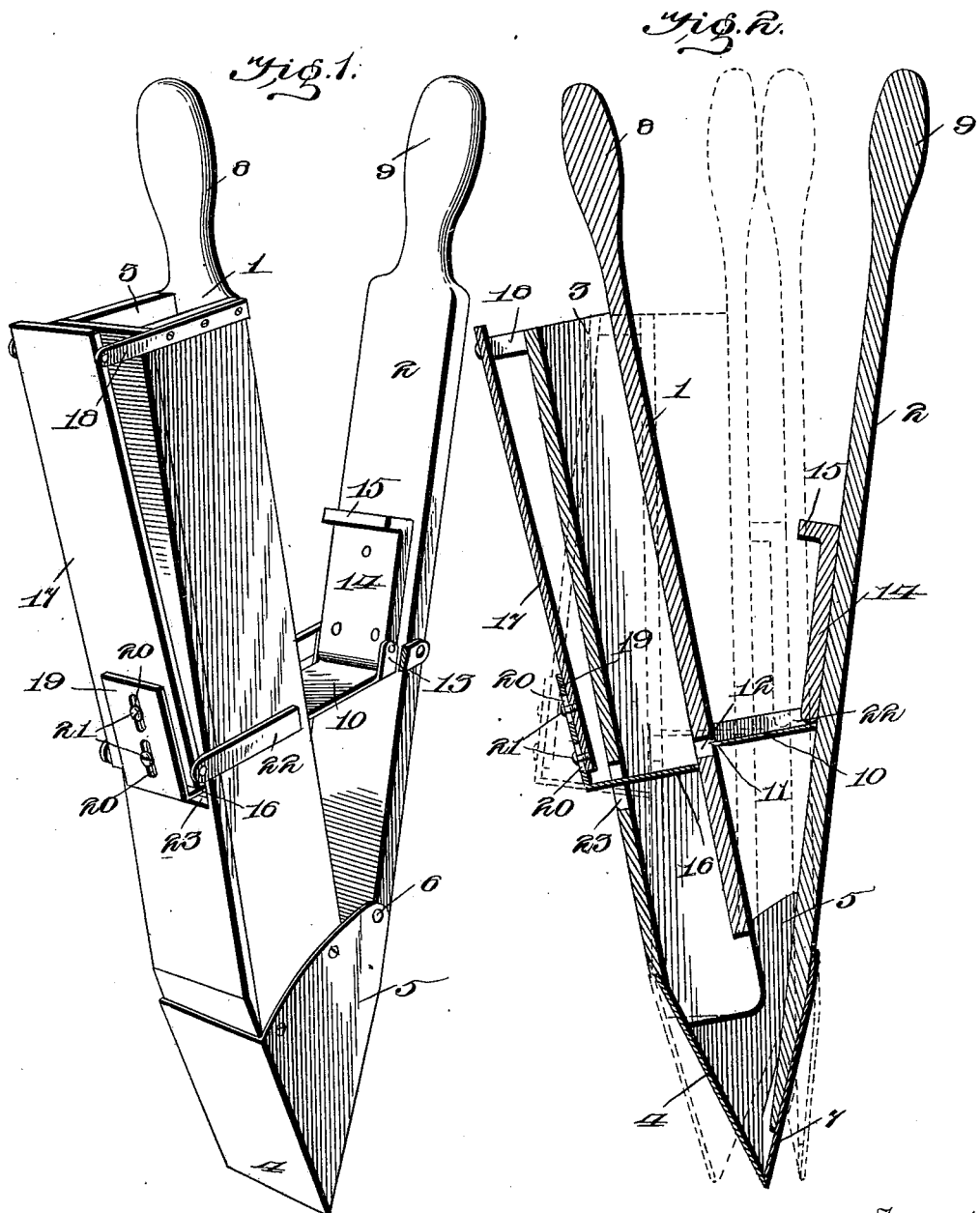

UNITED STATES PATENT OFFICE.

WILLIAM H. DILLON, OF VIRGINIA, ILLINOIS.

POTATO CUTTER AND PLANTER.

SPECIFICATION forming part of Letters Patent No. 671,953, dated April 16, 1901.

Application filed August 15, 1900. Serial No. 26,953. (No model.)

*To all whom it may concern:*

Be it known that I, WILLIAM H. DILLON, a citizen of the United States, residing at Virginia, in the county of Cass and State of Illinois, have invented a new and useful Potato Cutter and Planter, of which the following is a specification.

This invention relates to a novel potato-planter, one object being to produce a planter of the hand-operated type equipped with cutting mechanism for cutting the potatoes into pieces or planting-eyes and to be utilized for the purpose of planting the latter at a proper depth.

A further object of the invention is to provide for the regulation in size of the pieces of potato to be planted.

To the accomplishment of these objects and others subordinate thereto, as will hereinafter appear, the preferred form of the invention is embodied in the construction and arrangement of parts to be described, illustrated in the accompanying drawings, and defined in the appended claims.

In said drawings, Figure 1 is a perspective view of my planter complete; and Fig. 2 is a central longitudinal section therethrough, the open positions of the jaws being indicated in dotted lines.

Referring to the numerals of reference employed to designate corresponding parts in both views, 1 and 2 indicate a pair of pivoted members of any desired form, the member 1 being provided with an elongated hopper 3, opening at its lower end into a penetrating jaw 4, having extended side walls 5, pivoted at their upper corners, as indicated at 6, to the member 2. The jaw 4, in conjunction with a similar jaw 7 at the lower end of the member 2, defines a penetrating device to permit the lower end of the planter to be forced into the ground and to deposit the pieces of potato at the desired depth by drawing together the handles 8 and 9 of the pivoted members for the purpose of separating the jaws, as indicated in dotted lines in Fig. 2.

Thus far the device is not essentially different from usual forms of seed-planters; but I shall now proceed to describe the manner in which I equip the planter with potato-cutting mechanism arranged for actuation through the relative movement of the pivoted members as the latter are swung from or toward each other for the purpose of closing the jaws or for separating them to effect the deposit of the potato. This cutting mechanism comprehends a knife-plate 10, hinged at one end to the member 9 and having its cutting edge 11 disposed to be projected through an elongated transverse slot or opening 12 in the member 1 and to pass across the hopper for the purpose of severing the potatoes. The hinged connection between the knife-plate 10 and the member 2 is preferably effected by providing the rear end of the plate with a pair of upstanding ears 13, pivoted at the opposite sides of the lower end of a knife-block 14, mounted on the inner face of the member 2, and provided at its upper end with a stop 15. The stop 15 is designed to abut against the member 1 for the purpose of limiting the movement of the members to prevent the cutting edge of the knife-plate from being injured by violent contact with the outer wall of the hopper 3.

It is obvious that some means must be provided for holding the potatoes in position to be severed, for regulating the dimensions of the pieces to be cut, and for regulating the feed of the pieces from the hopper. These several ends I attain by providing a holding gage or feed plate 16, disposed in a plane lower than the knife-plate 10 and projecting across the hopper from the side opposite the knife-plate. The plate 16 is adjustably mounted at the lower end of a swinging arm 17, pivotally supported at its upper end between a pair of brackets 18, extending from the upper end of the hopper 3.

The adjustable mounting of the plate 16 upon the arm 17 is preferably effected by providing the plate with an angular extension 19, movable upon the arm adjacent to its lower edge and provided with elongated slots 20 for the reception of screws 21, projecting from the arm. It will now be evident that by loosening the screws 21 the plate 16 may be raised or lowered to regulate its position below the knife-plate, and thereby determine the dimensions of the planting-eyes to be cut from the potatoes retained in the hopper 3 and supported upon the gage and feed plate.

Ordinarily the plate 16 is designed to extend across the hopper for the purpose of preventing the gravitation of potatoes therefrom, and the knife-plate 10 is retracted to the exterior of the hopper, as shown more clearly in Fig. 2 of the drawings. With the parts in this position it will appear that the gage-plate 16 will hold the lowermost potato in position to be cut by the knife-blade when the latter is projected across the hopper; but it is evident that as the knife is projected the plate 16 must be retracted in order to permit the severed planting-eye to drop from the hopper into the jaws for deposit in the ground as the latter are separated. This end I attain by interdependently connecting the knife and plate supporting elements—that is to say, I connect the member 2 with the lower end of the arm 17 by a pair of links 22, pivotally connected at their opposite extremities to the member and arm, respectively. It is evident, therefore, that as the handles are brought together the approach of the members will cause the knife-plate 10 to be projected across the hopper and the feed-plate 16 to be simultaneously retracted from the hopper, to the end that by the simple manipulation of the handles 8 and 9 the potato is held in front of the knife, is severed by the knife, and is dropped between the jaws 5 and 7 into the ground. The adjustment of the plate 16 is accommodated by a transverse slot 23, formed in the outer wall of the hopper 3 and of considerably-greater width than the thickness of the plate passed therethrough.

In use the manipulation of my device is as follows: The plate 16 having been adjusted to secure the proper thickness of the potato-slices or planting-eyes, the jaws are forced into the ground, and after a sufficient penetration has been secured the handles are brought together to the position indicated in dotted lines in Fig. 2. This relative movement of the members will cause the knife-plate 10 to be projected across the hopper and to cut the potato resting upon the plate 16, said plate being retracted as the knife advances to permit the slices cut from the potato by the knife to fall from the hopper and pass between the jaws, which are now open, as shown by dotted lines in Fig. 2. The potatoes in the hopper 3 are now supported by the knife-plate 10 and will continue to be so supported until the knife is retracted from the hopper and the plate 16 is projected to the position shown in full lines in Fig. 2, at which time the potatoes will again rest upon the plate 16 to permit the repetition of the operation just described.

From the foregoing it will appear that I have produced a simple, inexpensive, and highly-efficient potato-planter embodying a construction calculated to effect the accomplishment of the several objects stated; but while the present embodiment of the invention appears at this time to be preferable I wish to reserve the right to effect such changes, modifications, and variations of both the construction and arrangement of parts as may be comprehended within the spirit of the invention.

What I claim is—

1. A potato-planter comprising a pair of pivotally-connected members one of which is provided with a hopper, of a cutter and gage-plate arranged to be projected across the hopper from opposite sides thereof, and means for effecting the actuation of the cutter and gage-plate through the relative movement of the members.

2. In a potato-planter of the character described, the combination with a pair of pivotally-connected members provided with penetrating jaws at their lower ends, of a hopper carried by one member, and a cutter and gage-plate both operatively connected with the other member said cutter being arranged to be projected across the hopper when the members are operated to open the jaws.

3. In a potato-planter of the character described, the combination with a pair of pivoted members provided with penetrating jaws at their lower ends, of a hopper carried by one member, a cutter connected to the other member and arranged to be projected across the hopper, a gage-plate disposed for projection across the hopper in a plane below the cutter, a swinging arm supporting the gage-plate, and means for moving said arm to retract the gage-plate as the cutter advances.

4. In a potato-planter of the character described, the combination with a pair of pivoted members provided with terminal jaws, of a hopper carried by one member, a cutter operatively connected to the other member and arranged for projection across the hopper, a swinging arm upon the exterior of the hopper, a gage-plate adjustably carried by the arm and extended into the hopper below the cutter, and means for operatively connecting said arm to the member to which the cutter is connected.

5. In a potato-planter of the character described, the combination with a pair of pivotal members provided with terminal jaws, of a hopper carried by one member, a swinging arm upon the exterior of the hopper, a gage-plate adjustably carried by the arm and extended into the hopper, a cutter pivotally connected to the other member, and links connecting the last-named member with the swinging arm.

6. In a potato-planter of the character described, the combination with a pair of pivotal members provided with terminal jaws, of a hopper carried by one member, a cutter carried by the other member and arranged to be projected across the hopper, and a stop projecting from said last-named member and arranged to abut against the other member to limit the relative movement of the members in one direction for the purpose of preventing injury to the cutter.

7. A potato-planter comprising a pair of pivotally-connected members provided with penetrating jaws, of a hopper carried by one member, a cutter arranged to be projected across the hopper by the relative movement of the members to open the jaws, and means for supporting the potato into position to be cut.

In testimony that I claim the foregoing as my own I have hereto affixed my signature in the presence of two witnesses.

WILLIAM H. DILLON.

Witnesses:
L. A. PETEFISH,
MATT YAPLE.